FIG. 1.

BORIS LEVENETZ
ETHRIDGE E. HARDESTY
INVENTORS

BORIS LEVENETZ
ETHRIDGE E. HARDESTY
INVENTORS

BY Lyon+Lyon
ATTORNEYS

BORIS LEVENETZ
ETHRIDGE E. HARDESTY
INVENTORS

BY Lyon+Lyon
ATTORNEYS

BORIS LEVENETZ
ETHRIDGE E. HARDESTY
INVENTORS

BY *Lyon + Lyon*

ATTORNEYS

United States Patent Office 3,333,778
Patented Aug. 1, 1967

3,333,778
UNIVERSAL FILAMENT WINDING MACHINE
Boris Levenetz, 2085 Laurinda Place, San Diego, Calif. 92105, and Ethridge E. Hardesty, 1 Star Rte., Pine Valley, Calif. 92062
Filed Mar. 27, 1964, Ser. No. 355,183
20 Claims. (Cl. 242—3)

This invention relates to apparatus for winding filament on a body and more particularly relates to such an apparatus for winding filament in any desired pattern on various mandrels of different sizes and shapes.

There are many instances where it is necessary or desirable to wind filament on a mandrel in a predetermined pattern. For example, in the construction of rocket motors, it has been found that a shell or casing made in this manner has a very high strength/weight efficiency, a vital characteristic in this field. In this type construction, the filaments are wound endlessly to cover all or a desired portion of a shape defining mandrel. The mandrel is then removed and rocket fuel inserted in its stead.

In this construction, the filament is, of course, the true stress resisting member. In order to transmit shear stresses, laterally between adjacent filaments and vertically through the section thickness, all filaments are bonded together by a resinous binder, providing a structural matrix of filaments and binder; the ratio by weight usually being in the order of 75% to 25%, respectively.

Because each filament must be oriented in a position to accommodate a predictable line of stress, it is necessary to arrange a pattern calculated to satisfy the stress requirements. If individual filaments, for instance, were used, each would constitute a ring. All such rings would be positioned on the surface of the mandrel in such a manner that no single ring would parallel any other ring. This would be true even if layers of rings were added to build up section thickness. Therefore, to employ a continuous filament it is required that the filament's path be constantly changed to distribute, evenly and in a predicted arrangement, the desired pattern of coverage.

It is therefore an object of the present invention to provide apparatus for winding filament on a mandrel in any desired pattern.

It is also an object of the present invention to provide such apparatus that may easily be modified to accommodate a wide variety of mandrel shapes.

It is another object of the present invention to provide such apparatus in which winding carriages traveling on a track lay filament on a mandrel, the track and the mandrel being relatively movable in more than one direction.

It is a further object of the present invention to provide such apparatus in which the speed of the carriages and the relative movements of the track and mandrel can be controlled to produce different winding patterns.

It is a still further object of the present invention to provide such apparatus in which the mandrel is rotatable and positioned within the track, the track is tiltable relative to the mandrel, and the axis about which the track tilts is movable relative to the mandrel.

It is a yet further object of the present invention to provide such apparatus in which a mechanism is provided for moving the axis of tilt of the track relative to the mandrel without moving the track itself relative to the mandrel.

The foregoing objects are realized by providing apparatus in which filament winding carriages are mounted for movement about a track which is positioned around the mandrel to be wound. The track is supported by a framework which includes a longitudinal track which cooperates with a slide mounted therein to permit longitudinal but not rotational movement of the slide. Means are provided for rotating the slide and thus the track about a horizontal axis relative to the mandrel which itself is rotated about a vertical axis. A gear and sprocket assembly and a pair of racks are provided for moving the slide in the longitudinal track without moving the track itself and thus varying the position of the axis of tilt of the track. Variable drive means are provided for controlling winding carriage speed, mandrel speed, and track tilt speed so that proper programming of these drives will result in the laying of the filament in a desired pattern. There is thus provided a single machine which can wind any desired filament pattern on a wide variety of mandrels and which can be automatically controlled by a predetermined program to assure adherence to a preselected winding pattern.

These and other objects and advantages of the present invention will be apparent from the accompanying description and drawings, in which.

Figure 1:
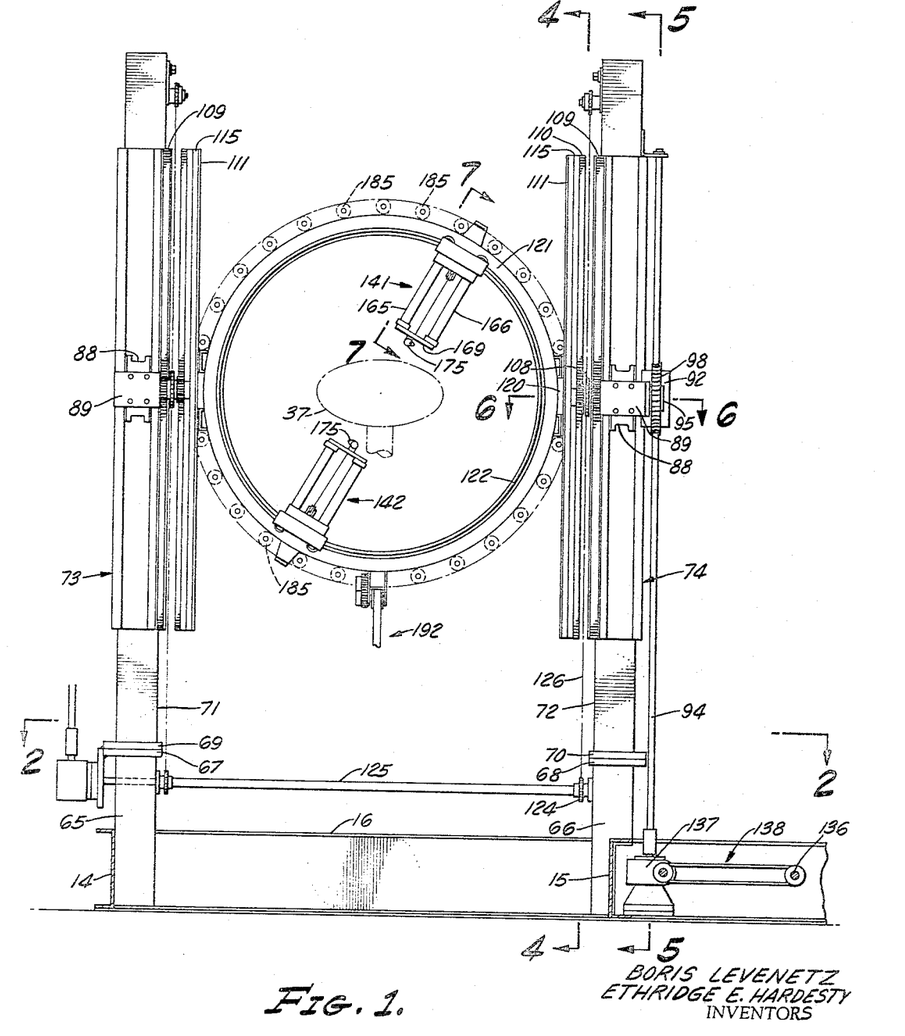
FIGURE 1 is a front elevation of the apparatus of the present invention.
Figure 2:
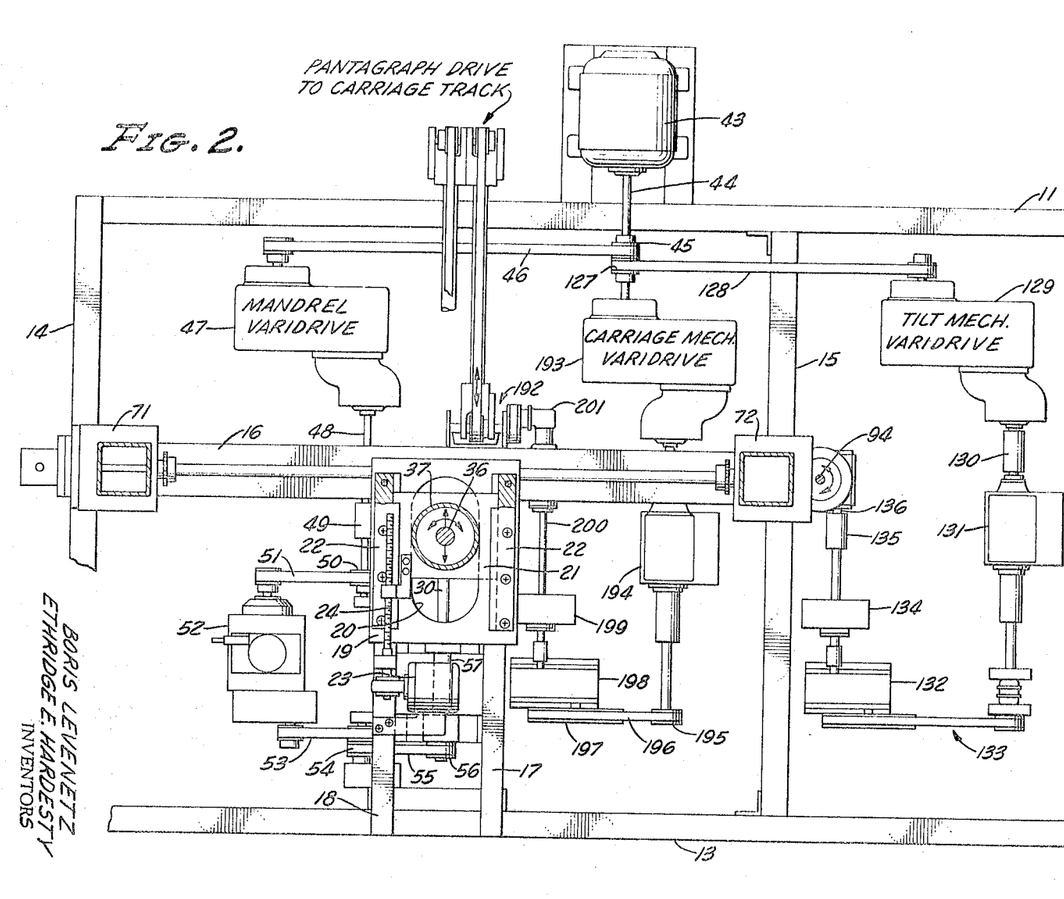
FIGURE 2 is a top plan view showing the basic structure of the present invention and the layout of the various drive systems.
Figure 3:
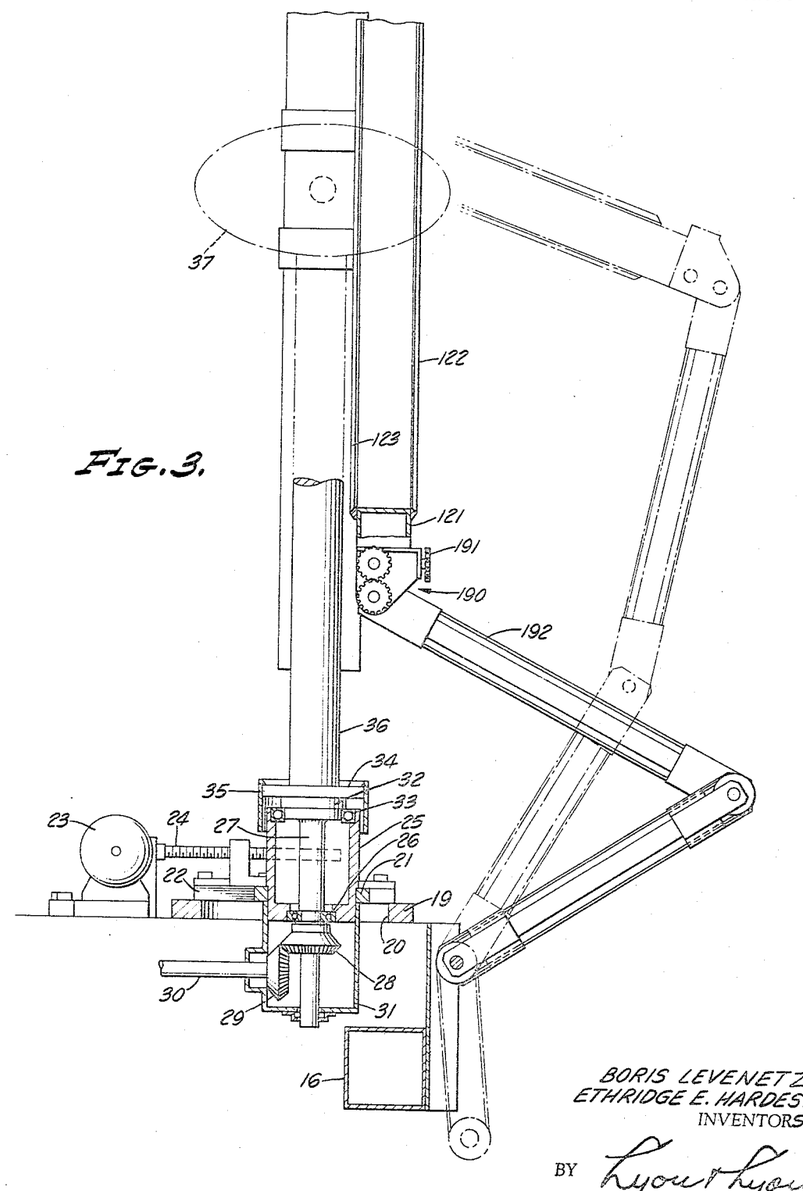
FIGURE 3 is a view, partly in section, of the mandrel and carriage drive assemblies.
Figure 4:
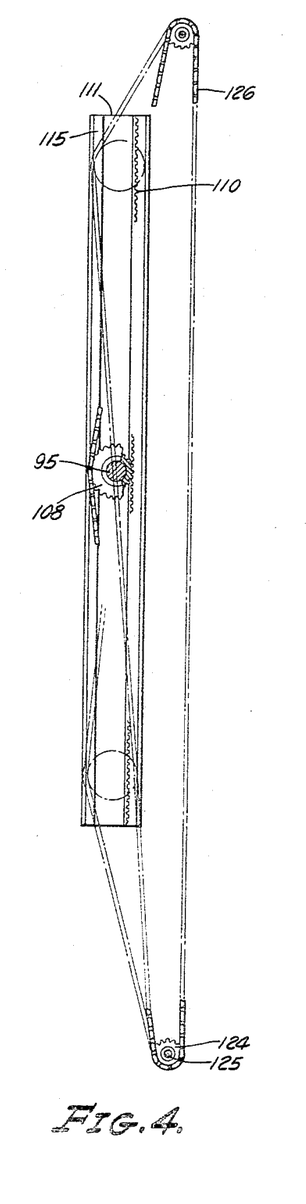
FIGURE 4 is a view taken along lines 4—4 of FIGURE 1.
Figure 5:
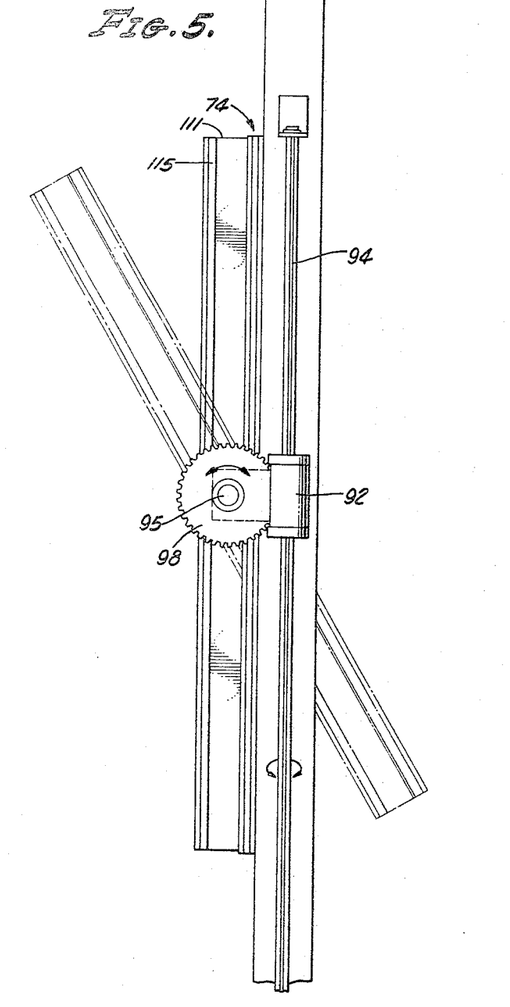
FIGURE 5 is a view taken along lines 5—5 of FIGURE 1.

The basic structure of the filament winding machine and the layout of the various drive systems are shown in FIGURES 1, 2 and 3. Four channels 11, 12, 13 and 14 are laid out and fastened in a rectangular pattern and a crossbeam 15 is fastened to the channels 11 and 13. A section of square tubing 16 is attached to the channel 14 and the crossbeam 15. A pair of channels 17 and 18 are mounted on the channel 13 and the tubing 16 and support a rectangular plate 19. The plate 19 is provided with an aperture 20 over which is positioned a movable plate 21. A pair of guide channels 22 bolted on either side of the aperture 20 guide the movement of the plate 21, the plate 21 being reversibly driven by a motor 23 and a drive screw 24. The motor 23 may be conveniently mounted on the channel 18.

A housing 25 is mounted on the plate 21 and carries a bearing 26 at its lower end. A shaft 27 is journaled in this bearing and has mounted thereon a miter gear 28. This miter gear 28 cooperates with a second miter gear 29 which is mounted on a drive shaft 30. The gears are enclosed in a housing 31. A collar 32 is welded to the shaft 27 and is mounted for rotation in the housing 25 by means of a thrust bearing 33. A plate 34 is fastened to the collar 32 and is provided with a ring 35 which covers the upper end of the housing 25 and the bearing 33. A shaft 36 is mounted on the plate 35 and serves to support a mandrel shown in phantom at 37 in FIGURE 3.

The system for driving the shaft 36 is shown in FIGURE 2. A driving motor 43 has an output shaft 44 on which is mounted a pulley 45. The pulley 45 is connected by a belt 46 to a varidrive 47 whose output shaft 48 is connected through a coupling 49 to a pulley 50. The pulley 50 is connected by a belt 51 to a variable drive 52. The variable drive gives reversible fine speed control and is connected by a belt 53 to a double pulley 54 which in turn is connected by belt 55 to a pulley 56 mounted on shaft 57. The shaft 57 telescopes over and drives the shaft 30. The position of the mandrel drive shaft 36 can thus easily be changed and fastened in a new position.

As can best been seen in FIGURE 1, a pair of columns 65 and 66 are fastened to the channel 14 and crossbeam 15 on either side of the mandrel drive assembly. These columns are topped by plates 67 and 68, respectively. Plates 69 and 70 are fastened to the plates 67 and 68 and support tubular columns 71 and 72. Vertical track assemblies 73 and 74 are fastened to the columns 71 and 72 in a manner shown in FIGURE 6. Since these assemblies are identical, only the assembly 74 is shown.

Figure 6:
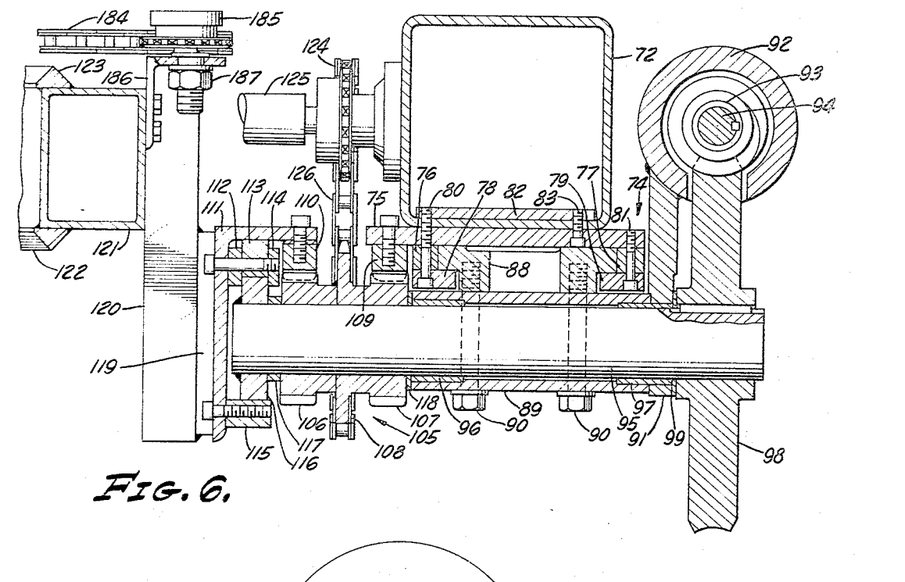
FIGURE 6 is a view taken along lines 6—6 of FIGURE 1.

This assembly comprises an elongated plate 75 on which are mounted elongated gibs 76 and 77 and elongated plates 78 and 79 by means of bolts 80 and 81. The bolt 80 passes through the column 72 and fastens the track assembly to a plate 82 as does a further bolt 83. The gibs 76 and 77 and plates 78 and 79 form a track in which is mounted a slide 88.

A bearing block 89 is secured to the slide 88 by means of bolts 90. The bearing block 89 is connected by means of a plate 91 to a housing 92 which encloses a worm 93 mounted on a splined shaft 94. A shaft 95 is rotatably mounted in the bearing block 89 by means of the bearings 96 and 97 and carries a worm gear 98 mounted on its outer end, the worm gear 98 being separated from the plate 91 by a shim or spacer 99. The worm gear 98 cooperates with the worm 93 to cause rotation of the shaft 95 upon rotation of the shaft 94.

A gear and sprocket assembly 105 is rotatably mounted on the shaft 95 and includes first and second gears 106 and 107 positioned intermediate and a sprocket 108 positioned intermediate the gears 106 and 107. The gear 107 cooperates with a rack 109 which is bolted to the plate 75 while the gear 106 cooperates with a rack 110 which is bolted to a track support guide frame 111. Also bolted to the track support guide frame 111 are pads 112, 113, 114, and 115 which serve to form a guide track for a plate 16 which is welded to the end of the shaft 95 whereby rotational movement of the shaft 95 will result in corresponding rotational movement of the track support guide frame 111. Thrust bearings 117 and 118 are provided on either side of gear and sprocket assembly 105.

A plate 119 is welded to the track support guide frame 111 and, in turn, has a pair of channels 120 welded thereto. A ring 121 is welded or otherwise suitably mounted on the channels 120 and has welded thereto, on either side thereof, a pair of circular tracks 122 and 123 which preferably are generally triangular in cross section. The tracks 122 and 123 serve to support winding carriages to be hereinafter described.

A drive sprocket 124 is mounted on the column 66 and is driven by shaft 125. The drive sprocket 124 is drivingly connected to sprocket 108 by a chain 126, and thus rotation of shaft 125 will cause rotation of the gear and sprocket assembly 105 on the shaft 95.

As can be seen from FIGURES 1 and 2, the shaft 94 is also driven by the driving motor 43. A second pulley 127 is mounted on the shaft 44 and drives a belt 128 which in turn supplies the input of a varidrive 129. The output of the varidrive 129 is connected through a coupling 130 to a transmission 131 which drives a reductor 132 through a belt and pulley system 133. The reductor 132 is connected by couplings 134 and 135 to a shaft 136 which drives shaft 94 through a right angle gear assembly 137 and a belt and pulley system 138.

As can be seen from FIGURE 1, winding carriages 141 and 142 are mounted on tracks 122 and 123 and serve to lay filament on the mandrel. The details of one of these winding carriages can be seen upon reference to FIGURES 7 and 8. Each winding carriage has a base 143 which is preferably a section of a channel and on which are mounted support plates 144 and 145. The support plate 144 has mounted therein a truck 146 which is held in place by nut 147. In a similar manner, a truck 148 is mounted in the support plate 145.

The truck 146 is provided with a pair of axles 149 and 150 which rotatably support wheels 151 and 152 which cooperate with the track 122. The truck 148 is similarly provided with a pair of axles 153 and 154 on which are mounted wheels 155 and 156 which cooperate with the track 123. As can be seen from FIGURE 1, two additional sets of wheels are also provided on each carriage to give it added stability.

Figure 7:
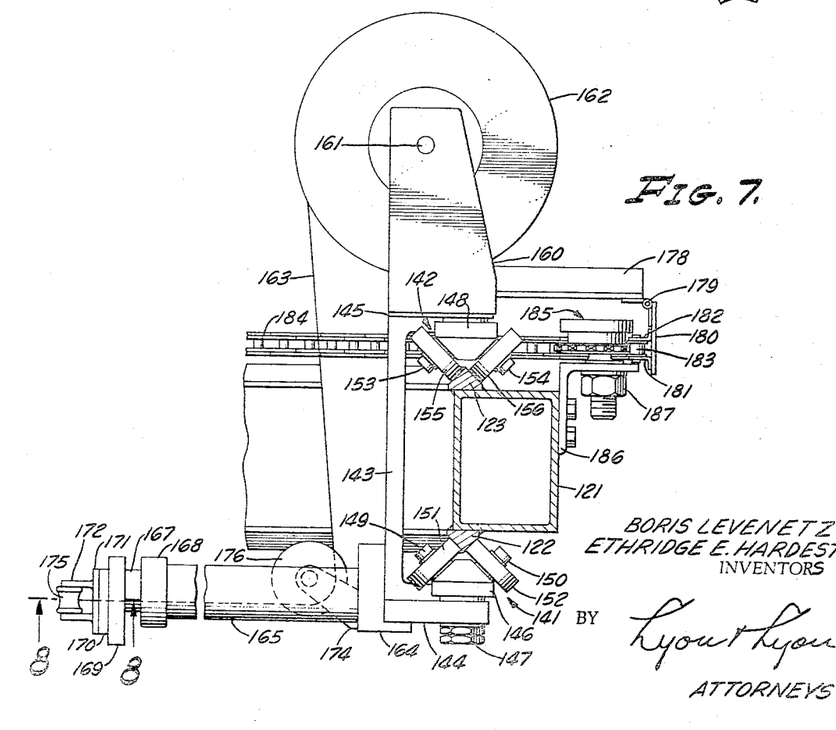
FIGURE 7 is a view taken along lines 7—7 of FIGURE 1.
Figure 8:
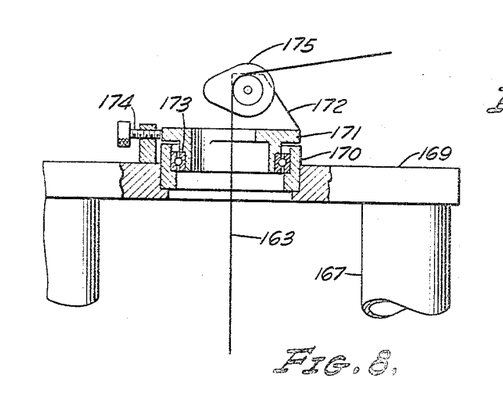
FIGURE 8 is a view taken along lines 8—8 of FIGURE 7.

A pair of brackets 160 are mounted on the support plate 145 and support a shaft 161. A roller or spool 162 is mounted for rotation on the shaft 161 and serves as a store of filament 163.

A plate 164 is positioned on the base 143 and support plate 144 and has mounted therein a pair of tubular members 165 and 166. Each of these tubular members is provided with an inner tubular member 167 which telescopes therein in order to provide a variable length and thus accommodate different size mandrels. A coupling 168 is provided for joining the two tubular members. The ends of the tubular members 167 are joined by a cross plate 169 in which is mounted a bearing housing 170. A guide bracket 171 having a pair of upstanding ears 172 is rotatably mounted in the bearing housing 170 by a bearing 173. The guide bracket may be prevented from rotating by a set screw 174. A guide spool 175 is mounted between the ears 172 and serves to lay the filament on the mandrel. The filament 163 is guided from the feed spool 162 to the guide 175 by a guide roller 176 mounted on brackets 174. This construction permits the guide spool 175 to rotate to position 90° apart for reasons to be explained below.

An angle 178 is attached to the support plate 145 and is joined by a hinge 179 to a plate 180. The plate 180 has mounted thereupon a pair of lugs 181 and 182 which support a roller 183. This roller and lug assembly forms part of a roller chain 184 which is used to drive the winding carriages. The chain 184 passes around a plurality of idler sprockets 185, each of which is mounted on a bracket 186 fastened to the ring 121. A nut 187 holds the idler sprocket in place. Each of the idler sprockets is preferably provided with an eccentric mounting so that chain slack may be taken up.

As can be seen in FIGURE 3, the chain 184 is driven by a drive sprocket 190 which in turn is driven by a right angle gear assembly 191. The right angle gear assembly 191 is driven by a conventional pantagraph drive 192. As can be seen from FIGURE 2, this pantagraph drive is driven by the driving motor 43 through a varidrive 193 and a transmission 194. The output shaft of the transmission 194 is connected to a pulley 195. The pulley 195 is connected by means of belt 196 to a pulley 197 which provides the input for a reductor 198. The output of the reductor 198 is connected by a coupling 199 to a shaft 200 which is connected to the pantagraph drive by a right angle gear assembly 201.

The operation of the above described filament winding machine is as follows. In describing the operation, the track supporting apparatus mounted on the columns 71 and 72 will be discussed in the singular. It should be understood, however, that the same procedures are being followed as to the duplicate equipment on the other column. A desired mandrel is first selected, and the shaft 36 is then positioned at the proper location relative to the columns 71 and 72 by driving the movable plate 21 to the desired portion of the plate 19, and making any corresponding changes that may be necessary in the shafts 30 and 57 of the mandrel driving train. The selected mandrel may now be mounted on the shaft 36, or this may be done after the remainder of the setting up operation is completed.

The slide 88 carrying the bearing block 89 is now moved up the track 74 mounted on the column 72 by means of the drive chain 126 which is driven by turning the torque shaft 125 by any suitable means, for example, a handle. The chain 126 cooperates with the sprocket 108 of the gear and sprocket assembly 105 to cause this assembly to rotate on the shaft 95. At this stage of the operation, the track support guide frame 111 and its associated slide track forming members have not yet been positioned about the slide plate 116, and thus the only action caused by rotation of the gear and sprocket assembly 105 is the travel of the gear 107 up the rack 109. Upward movement of the bearing block 89 on the track 74, of course, causes the worm 93 and housing 92 to slide upwardly on the splined shaft 94.

When the bearing block 89 is at the desired height relative to the mandrel 37, the track support guide frame 111, its associated plates 119 and 120, the ring 121 and the tracks 122 and 123 are raised into place manually or by any conventional lifting mechanism. Elongated pads 112, 113 and 114 are positioned about one end of the slide plate 116 and the gear 106 is meshed with the rack 110. The elongated pad 115 is now bolted in position to contain the slide plate 116 such that it can move along the track formed by the various elongated pads but cannot rotate in it.

Winding carriages 141 and 142 are now mounted on the tracks 122 and 123 and the filament guide spools 172 are properly positioned relative to the mandrel 37 by means of the telescoping outer and inner tubular members 165 and 167 and the couplings 168. Of course, the carriages may be mounted on the tracks 122 and 123 prior to positioning these tracks about the mandrel 37 if such is convenient.

The desired axis about which the tracks 122 and 123 are to tilt relative to the mandrel 37 may now be established. Let it be initially assumed that the track support guide frame 111 and its associated structure is fastened about the slide plate 116 and the gear 106 is meshed with the rack 110 such that the shaft 95 rotatably mounted in the bearing block 89 is coaxial with the horizontal axis of the mandrel 37. If this tilting axis is desired for the particular filament pattern to be wound, the mandrel drive train is now furnished power and the mandrel 37 begins to rotate. Power is also supplied to the pantagraph drive 192, and the winding carrages 141 and 142 begin their travel about the tracks 122 and 123, laying filament on the mandrel 37.

In order that the filament lines not be laid one on top of the other and accumulate on what might be considered the polar regions of the mandrel, the tilt drive train is energized to rotate the splined shaft 94. Rotation of the shaft 94 causes rotation of worm 93 and consequent rotation of worm gear 98 and shaft 95. Since the slide plate 116 is welded to the shaft 95 and cannot rotate in the track formed about it, this track, the track support guide frame 111, the ring 121 and the tracks 122 and 123 all rotate about the tilting axis, thus displacing the polar regions of the mandrel 37 and better distributing the laid filament. The tilt drive train operation may be programmed in any suitable manner to cause the direction of movement of the tracks 122 and 123 to be reversed after they have traveled through a predetermined arc in each direction.

Figure 9:
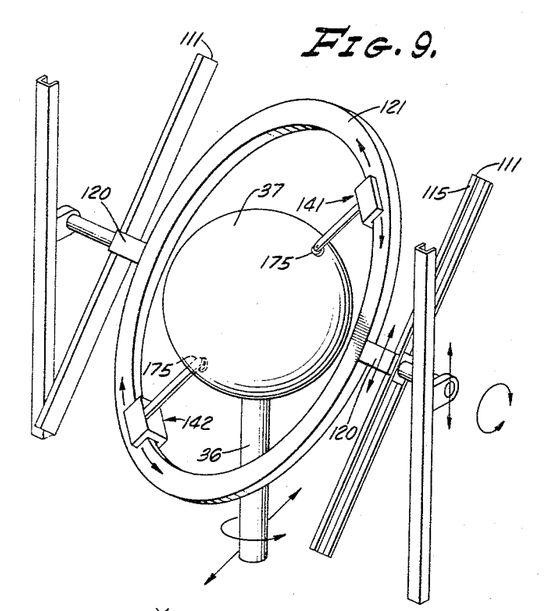
FIGURE 9 is a schematic representation of the possible movements of the various parts of the apparatus of the present invention.
Figures 10, 11:
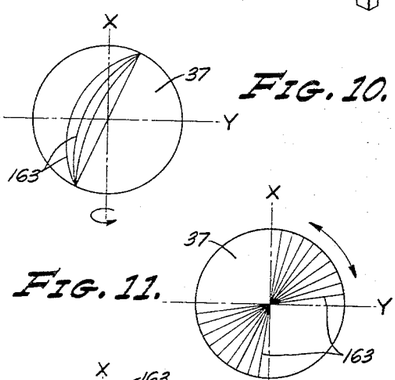
FIGURES 10, 11, 12, 13, 14 and 15 show various winding patterns that can be formed by the apparatus of the present invention.
Figure 12:
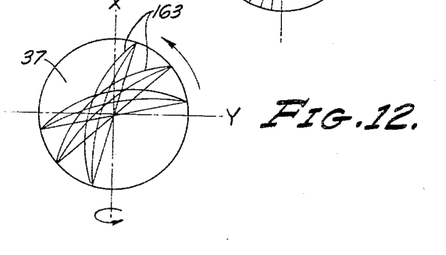

The directions in which the various elements of the apparatus may move are shown in FIGURE 9. The patterns wound by this apparatus in the manner described above can be seen by reference to FIGURES 10, 11 and 12. In these figures, the mandrel is assumed to rotate about the X axis and the track tilts about the Z axis. In FIGURE 10, there is shown the pattern that will be formed if only the mandrel is rotated, the tilt angle of the track remaining stationary. As can be seen, all of the lines will cross at both a north (upper) and a south (lower) polar region, thus making the casing much thicker at these regions than elsewhere. FIGURE 11 shows the pattern that will be formed if the track is tilted, but the mandrel kept stationary. In this pattern also all of the filament lines cross in two well defined regions. FIGURE 12 shows a combination of these two patterns formed by simultaneously rotating the mandrel and varying the tilt angle of the track. This is the pattern that is normally used and, as can be seen, results in an even distribution of the filament over the mandrel, without any regions of excess thickness.

In the above description, it was assumed that the tilting axis was desired to be coaxial with the horizontal axis of the mandrel. There are many situations, however, where this is not the case. It may be desired that the axis of tilt of the track be displaced above or below the mandrel's horizontal axis. For example, consider the situation where it is desired to wind filament on a mandrel, yet leave one polar area of the mandrel free of filament. If it is the lower or south polar area that is to be left free of filament, it is necessary to establish the axis of tilt of the track below the horizontal axis of the mandrel. This is accomplished by returning the track support guide frame 111 to the vertical position so that the rack 109 is parallel to the rack 110. The chain 126 is now driven in a counter-clockwise direction by the torque shaft 125 with the result that the gear and sprocket assembly 105 is rotated on the shaft 95.

As the gear and sprocket assembly 105 rotates, the gear 107 travels down the rack 109, and causes the bearing block 89 to also travel downwardly. At the same time, the gear 106 is also traveling downwardly, and its rotation causes the rack 110 to move upwardly relative to the gear 106. This movement of the gear 106 downwardly relative to the rack 109 and the simultaneous movement upwardly of the rack 110 results in no net relative motion between the rack 109 and the rack 110, and consequently there is no relative movement between the winding carriages 141 and 142 mounted on the track and the mandrel 37. Thus, only the position of the axis of tilt of the track has been changed. The motor 23 is now energized to drive the plate 21 and therefore the mandrel 37 to the proper position relative to the columns and the track. The mandrel drive, winding carriage drive and tilt drive are now supplied power and the winding proceeds in the same manner as previously, the speed of each drive being properly programmed to achieve the desired pattern.

Figure 13:
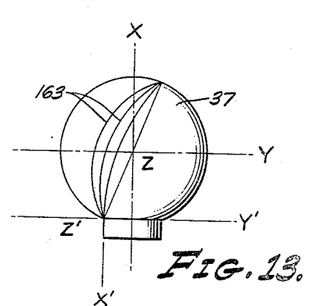
Figure 14:
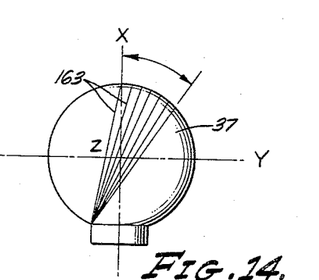
Figure 15:
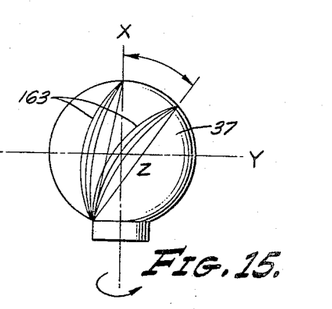

The patterns wound by the apparatus when it is arranged in this manner is shown in FIGURES 13, 14 and 15. In these figures, the tilt axis is located just a little above the bottom of the mandrel at coordinates X', Y', Z'. FIGURE 13, like FIGURE 10, shows the pattern formed by rotating the mandrel while keeping the track at a constant tilt angle. FIGURE 14, like FIGURE 11, shows the pattern formed by holding the mandrel stationary and varying the angle of tilt. FIGURE 15, like FIGURE 12, shows the composite pattern formed by both rotating the mandrel and varying the angle of tilt. As can be seen in this figure, the lower or south polar area will be maintained free of filament, while the remainder of the mandrel will be covered by a well distributed filament pattern.

The positioning of the tilt axis in this location results in a considerable overlay of filament in the region immediately surrounding the open polar area. This is generally advantageous as this added strength is useful for supporting or attaching an external member to the mandrel. For example, when winding a rocket motor, this added strength is required to support the nozzle that is positioned over the open area.

The mandrels shown and described thus far have been spherical in configuration; however, the present apparatus is not restricted to use with spherical mandrels but may be used with any mandrel that is a geometric body of revolution. One common example of such a body is a cylinder with a half sphere on each end, or a "sausage" mandrel. In order to wind a filament pattern on such a sausage, it is only necessary that the tracks be provided with straight sections corresponding to the cylindrical portion of the sausage. Such a track is shown schematically in FIGURE 16.

Figure 16:
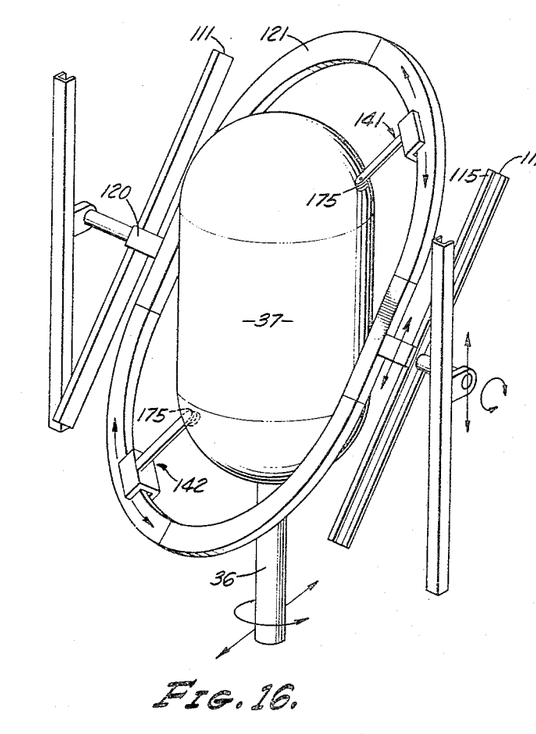
FIGURE 16 is a schematic representation of the possible movements of the various parts of a modification of the apparatus of the present invention.

The manner in which such a track would be constructed is obvious to those skilled in the art and is thus not illustrated or described in detail. Generally, the ring 121 would be constructed of various curved and straight sections bolted or otherwise fastened together, each section carrying corresponding track sections. The ring and track sections necessary in a desired operation would be selected and assembled, and the ring then bolted or otherwise fastened to the channel 120.

Figure 17:
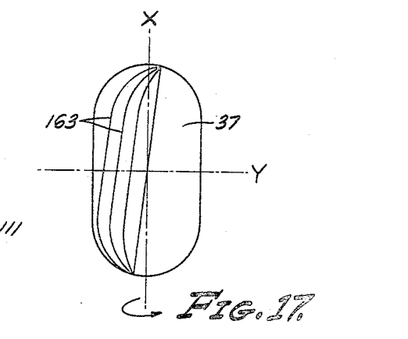
FIGURE 17, 18 and 19 show various winding patterns that can be formed by the modified apparatus of FIGURE 15.
Figure 18:
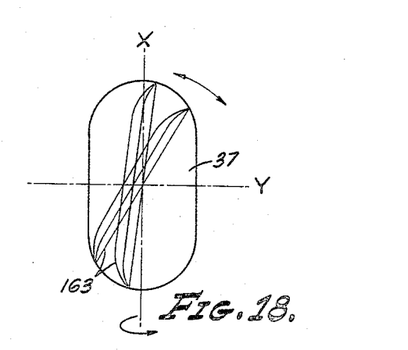

The actual winding is accomplished in the same manner as with a spherical mandrel. Once again it is generally desired to continuously vary the track tilt angle during the winding operation, and to be able to change the location of the tilt axis between winding operations. Like FIGURE 9, FIGURE 16 shows the various movements the elements of the apparatus may make. The patterns resulting from not varying the angle of tilt and from varying the angle of tilt during a winding operation are shown in FIGURES 17 and 18 which are similar to FIGURES 10 and 12. In forming these various patterns, the speed of the winding carriages traveling around their tracks is usually considerably greater than the speed of rotation of the mandrel.

Figure 19:
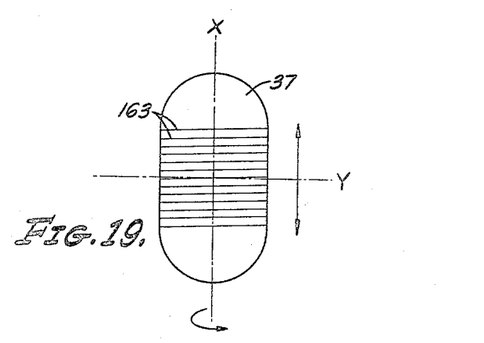

FIGURE 19 shows a winding pattern that is often desirable when winding a sausage type mandrel. The filament is laid in a nearly horizontal pattern over the length of the cylindrical portion of the mandrel. This pattern is commonly superimposed over the combination pattern shown in FIGURE 17. This horizontal pattern is achieved by rotating the brackets 171 in the bearing housings 170 of the winding carriages 141 and 142 so that the guide spools 175 are displaced 90°. In the laying of the filament, the mandrel 37 is rotated at a speed much greater than the speed at which the winding carriages are driven up and down the straight portions of the track so that a helical pattern is developed, with one line or rope of filament deposited directly adjacent the preceding one. During this type operation, use of the track tilting apparatus is not necessary.

From the foregoing description, it can be seen that apparatus has been provided for winding any desired pattern on a wide variety of mandrels. In the apparatus, the speed of rotation of the mandrel, the speed of the winding carriages and the speed of track tilt can all be controlled or programmed relative to each other to give absolute and certain control over the pattern being formed. Moreover, the axis about which the track tilts relative to the mandrel and the horizontal position of the mandrel itself may easily be changed, without moving the track vertically relative to the mandrel, to provide further winding pattern variations. The track itself may be constructed in various shapes to enable it to correspond to the shape of the mandrel being wound.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. Apparatus for winding filament on a mandrel, comprising: means for supporting said mandrel; track means positioned around said mandrel; means mounting said track means for tilting movement about an axis relative to said mandrel; filament laying means mounted on said track means; means for driving said filament laying means around said track means; and means for changing the position of the axis around which said track means tilts.

2. Apparatus for winding filament on a mandrel, comprising: means for supporting said mandrel; frame means; track means; supporting means connected to said track means; filament laying means mounted on said track means; means for driving said filament laying means around said track means; and means connecting said supporting means to said frame means to position said track means around said mandrel, said connecting means including first means operable to tilt said track means relative to said mandrel and second means operable to change the position of the axis around which said track means tilts.

3. Apparatus for winding filament on a mandrel, comprising: means for supporting said mandrel; track means; supporting means connected to said track means; frame means; means connecting said supporting means to said frame means to position said track means around said mandrel; rotatable means mounted in said connecting means for tilting said track means about an axis relative to said mandrel, selectively operable drive means operatively associated with said connecting means movable to move said rotatable means relative to said supporting means and to said frame means while maintaining the same position of said supporting means relative to said frame means whereby the position of said tilting axis relative to said mandrel may be changed; and filament laying means mounted on said track means for travel on said track means around said mandrel.

4. Apparatus for winding filament on a mandrel, comprising: first rotatable means for supporting said mandrel; means for rotating said first rotatable means about an axis; track means; supporting means connected to said track means; a frame; slide means slidably mounted on said frame, said slide means including means connected to said supporting means to position said track means around said mandrel; second rotatable means mounted in said slide means for tilting said track means about an axis perpendicular to the axis of rotation of said first rotatable means, selectively operable drive means operatively associated with said slide means and connected means to move said second rotatable means relative to said frame and to said supporting means while maintaining the same position of said supporting means relative to said frame whereby the position of said tilting axis relative to said mandrel may be changed; filament laying means mounted on said track means; and means for driving said filament laying means around said track means.

5. The apparatus of claim 4 wherein means are provided for moving said first rotatable means relative to said frame.

6. Apparatus for winding filament on a mandrel, comprising: first rotatable means for supporting said mandrel; means for rotating said first rotatable means; track means; supporting means connected to said track means; a frame; slide means slidably mounted on said frame; second rotatable means mounted in said slide means; means connecting said second rotatable means to said supporting means to permit longitudinal motion and prevent rotational motion of said second rotatable means relative to said supporting means; means mounted on said second rotatable means and operatively connected to said frame and to said supporting means to position said track means around said mandrel, said operatively connected means being movable relative to said frame and to said supporting means while maintaining the same position of said supporting means relative to said frame; filament laying means mounted on said track means; means for driving said filament laying means around said track means; means for rotating said second rotatable means; and means for imparting motion to said operatively connected means.

7. Apparatus for winding filament on a mandrel, comprising: rotatable means for supporting said mandrel; means for rotating said rotatable means; track means; supporting means connected to said track means; a frame having a track formed therein; a slide member slidably mounted in said track; a shaft rotatably mounted in said slide member; means connecting said shaft to said supporting means to permit longitudinal motion and prevent rotational motion of said shaft relative to said supporting means; a gear assembly rotatably mounted on said shaft, said gear assembly having first and second gears thereon; a first rack mounted on said frame; a second rack mounted on said supporting means; said first and second gears operatively cooperating with said first and second racks to position said track means around said mandrel and to enable said gear assembly, shaft and slide member to move relative to said frame and said supporting means while maintaining the same position of said supporting means relative to said frame; filament laying means mounted on said track means; means for driving said filament laying means around said track means; means for rotating said shaft; and means for rotating said gear assembly on said shaft.

8. The apparatus of claim 7 wherein said supporting means is provided with a longitudinal track and wherein a plate slidably mounted in said track and restrained against rotation by said track is fixedly mounted on said shaft.

9. The apparatus of claim 7 wherein means coupled to said mandrel supporting means are provided for moving said means relative to said frame.

10. Apparatus for winding filament on a mandrel, comprising: a drive shaft for supporting said mandrel; drive means for rotating said mandrel; track means; a support member connected to said track means, said support member having a longitudinal track formed therein; a frame having a track formed therein; a slide member slidably mounted in said track in said frame; a plate slidably mounted in said track in said support member, said plate being restrained against rotational motion by said track; a shaft rotatably mounted in said slide member and having one end fixedly connected to said plate whereby rotation of said shaft causes rotation of said support member and said track means; a worm gear mounted on the other end of said shaft; a splined shaft mounted on said frame parallel with said track; a worm slidably mounted on said splined shaft and operatively engaged with said worm gear whereby rotation of said splined shaft causes rotation of said worm and consequent rotation of said shaft; a gear assembly rotatably mounted on said shaft adjacent said one end thereof, said gear assembly having first and second gears thereon; a first rack mounted on said frame parallel to said frame track; and a second rack mounted on said support member parallel to said support member track; said first and second gears operatively cooperating with said first and second racks to position said track means around said mandrel and to enable said slide member, said shaft, said plate, said gear assembly and said worm to move relative to said frame and said support member without changing the position of said support member relative to said frame whereby the position of the axis of rotation of said track means relative to said mandrel may be changed.

11. The apparatus of claim 10 wherein a plurality of filament laying carriages are mounted on said track means and drive means are provided for moving said carriages around said track whereby filament is laid on said mandrel.

12. The apparatus of claim 11 wherein said carriages are provided with guide spools for guiding said filament onto said mandrel, said guide spools being rotatable from a first position to a second position.

13. The apparatus of claim 11 wherein drive means are provided for rotating said splined shaft and wherein drive shaft rotating drive means, said carriage drive means and said splined shaft rotating drive means are variable and reversible whereby various filament patterns may be formed on said mandrel.

14. The apparatus of claim 10 wherein said track means includes a ring connected to said support member and a track mounted on said ring.

15. The apparatus of claim 14 wherein said ring and said track thereon are made of a plurality of connected sections.

16. The apparatus of claim 15 wherein both straight and curved ring and track sections are assembled to construct said track means.

17. The apparatus of claim 10 wherein means are provided for moving said drive shaft relative to said frame.

18. Apparatus for changing the position of the axis of rotation of a rotatable member comprising: a frame having a track formed therein; a slide member slidably mounted in said frame track; a shaft rotatably mounted in said slide member means connecting said shaft to said rotatable member to permit longitudinal motion and prevent rotational motion of said shaft relative to said rotatable member; a gear assembly rotatably mounted on said shaft, said gear assembly having first and second gears thereon; a first rack mounted on said frame; and a second rack mounted on said rotatable member; said first and second gears operatively cooperating with said first and second racks to enable said gear assembly, shaft and slide member to move relative to said frame and said rotatable member while maintaining the same position of said rotatable member relative to said frame.

19. Apparatus for changing the position of the axis of rotation of a rotatable member comprising: a frame having a track formed therein; a slide member slidably mounted in said frame track; a longitudinal track formed on said rotatable member; a plate slidably mounted in said rotatable member track, said plate being restrained against rotational motion by said track; a shaft rotatably mounted in said slide member and having one end fixedly connected to said plate whereby rotation of said shaft causes rotation of said rotatable member; a worm gear mounted on the other end of said shaft; a splined shaft mounted on said frame parallel with said track; a worm slidably mounted on said splined shaft and operatively engaged with said worm gear whereby rotation of said splined shaft causes rotation of said worm and consequent rotation of said shaft; a gear assembly rotatably mounted on said shaft adjacent one end thereof; said gear assembly having first and second gears thereon; a first rack mounted on said frame parallel to said frame track; and a second rack mounted on said rotatable member parallel to said rotatable member track; said first and second gears operatively cooperating with said first and second racks to enable said slide member, said shaft, said plate, said gear assembly and said worm to move relative to said frame and said rotatable member while maintaining the same position of said support member relative to said frame.

20. A winding machine comprising a mandrel rotatable about a first axis, an endless track means lying in a plane which intersects said mandrel, filament laying means mounted on said track means, means for driving said filament laying means along said track means; means mounting said track means for tilting movement around a second axis of rotation perpendicular to said first axis, and means for displacing said first axis of rotation and said second axis of rotation relative to one another.

References Cited

UNITED STATES PATENTS

| 2,855,158 | 10/1958 | Pumphrey et al. | 242—2 |
| 2,966,935 | 1/1961 | Wiltshire | 242—2 X |
| 3,043,527 | 7/1962 | Ruf | 242—2 |
| 3,255,976 | 6/1966 | Mede | 242—7 |

FRANK J. COHEN, *Primary Examiner.*

STANLEY N. GILREATH, *Examiner.*

B. S. TAYLOR, *Assistant Examiner.*